(12) United States Patent
Labry

(10) Patent No.: US 11,225,322 B2
(45) Date of Patent: Jan. 18, 2022

(54) BRAKE ROD

(71) Applicant: Ratier-Figeac SAS, Figeac (FR)

(72) Inventor: Pierre-Jacques Labry, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 320 days.

(21) Appl. No.: 16/289,716

(22) Filed: Mar. 1, 2019

(65) Prior Publication Data

US 2019/0315452 A1    Oct. 17, 2019

(30) Foreign Application Priority Data

Apr. 16, 2018  (EP) ..................................... 18305466

(51) Int. Cl.
| | |
|---|---|
| B64C 25/44 | (2006.01) |
| B64C 13/04 | (2006.01) |
| F16H 21/44 | (2006.01) |
| F16H 51/00 | (2006.01) |
| F16H 57/00 | (2012.01) |
| F16C 11/06 | (2006.01) |
| F16C 7/00 | (2006.01) |
| F16C 11/04 | (2006.01) |
| B64C 13/30 | (2006.01) |

(52) U.S. Cl.
CPC ............ B64C 25/44 (2013.01); B64C 13/044 (2018.01); B64C 13/30 (2013.01); F16C 7/00 (2013.01); F16C 11/045 (2013.01); F16C 11/0614 (2013.01); F16H 21/44 (2013.01); F16H 51/00 (2013.01); F16H 57/00 (2013.01); *F16H 2057/0081* (2013.01)

(58) Field of Classification Search
CPC ....... B64C 25/44; B64C 13/044; B64C 13/30; F16C 7/00; F16C 11/045; F16C 11/0614; F16H 21/44; F16H 51/00; F16H 57/00
See application file for complete search history.

(56) References Cited

U.S. PATENT DOCUMENTS

| | | | | |
|---|---|---|---|---|
| 4,072,431 | A  * | 2/1978 | Waight | ................ F16C 11/0614 403/149 |
| 6,371,681 | B1 * | 4/2002 | Covington | ............ B64C 27/605 403/158 |
| 8,197,153 | B2 * | 6/2012 | Halcom | .............. F16C 11/0614 403/114 |
| 9,272,781 | B2 * | 3/2016 | Day | ...................... B64C 27/605 |

FOREIGN PATENT DOCUMENTS

| | | |
|---|---|---|
| EP | 1918195 A1 | 5/2008 |
| EP | 2514982 A2 | 10/2012 |
| FR | 1116190 A | 5/1956 |
| FR | 3031083    * | 7/2016 |
| FR | 3031083 A1 | 7/2016 |
| WO | 2014106428 A1 | 7/2014 |

OTHER PUBLICATIONS

Extended European Search Report for International Application No. 18305466.7 dated Sep. 10, 2018, 6 pages.

* cited by examiner

*Primary Examiner* — Justin M Benedik
(74) *Attorney, Agent, or Firm* — Cantor Colburn LLP

(57) ABSTRACT

A brake rod for a steering/braking mechanism includes a rod body having a longitudinal axis, a rod end at a first end of the rod body, the rod end having a bore therethrough having a bore axis arranged generally perpendicular to the rod longitudinal axis, and a rod end shield mounted to the rod and extending in a longitudinal direction axially beyond the rod end.

16 Claims, 7 Drawing Sheets

BRAKE ROD

FOREIGN PRIORITY

This application claims priority to European Application No. 18305466.7 filed Apr. 16, 2018, the entire contents of which is incorporated herein by reference.

TECHNICAL FIELD

The present disclosure relates to a brake rod, particularly a brake rod for use in a steering/braking mechanism for an aircraft, a steering/braking mechanism incorporating the rod and a shield for the rod.

BACKGROUND

In aircraft control systems, it is common for a steering function and a braking function to be provided in a single mechanism. Movement of a pedal in a first manner causes a steering movement in the mechanism while movement of the pedal in a second manner causes a braking movement in the mechanism. It is desirable that breakage or disconnection of a rod in the mechanism does not cause the rod to become jammed in the mechanism which could lead to uncommanded braking.

SUMMARY

From a first aspect, the disclosure provides a brake rod for a steering/braking mechanism. The brake rod comprises a rod body and a rod end at a first end of the rod body. The brake rod further comprises a rod end shield mounted to the rod and extending in a longitudinal direction axially beyond the rod end.

The rod end shield may be curved so as to extend partially around the rod end.

In some embodiments, the rod end may be a separate component from the rod body and be mounted thereto. The rod end shield may be mounted to the rod body. In other embodiments the rod end may be formed integrally with the rod body.

In various embodiments, the rod end shield may comprise a base portion mounted to the rod and a shield portion extending therefrom.

The brake rod may comprise a clamp clamping the base portion to the rod.

The clamp may comprise a tie wrap. The base portion may comprise a groove for receiving the tie wrap.

In other embodiments, the brake rod may comprise a fastener, for example a screw, attaching the base portion to the rod.

In various embodiments, the shield portion may comprise a proximal straight portion for extending along an external surface of the rod and a distal curved portion for extending around the rod end.

The rod end shield may extend around an axis of a bore of the rod end as far as a longitudinal axis of the rod.

In various embodiments, the rod end shield (100; 200) may be a sheet metal or plastics component.

In various embodiments, the rod end shield is mounted to the rod at a single axial location of the rod.

The disclosure also extends to a steering/braking mechanism for an aircraft. The mechanism comprises a mount receiving a first pivot shaft and a second pivot shaft. A first steering arm is pivotally mounted about the first pivot shaft, and has a first clevis at a first end arranged on one side of the first pivot shaft for rotatably receiving a pedal shaft and a second clevis at a second end arranged on an opposite side of the first pivot shaft for rotatably receiving a first steering rod. A first brake crank is fixedly mounted to the first pedal shaft at a first end received within the first clevis and has a third clevis at a second end. The mechanism further comprises a brake rod in accordance with the disclosure. The rod end bore of the rod end is being arranged within the third clevis and receives a clevis pin connecting the rod end to the third clevis. The rod end shield is received in the third clevis between the rod end and the first brake crank. The brake rod also has a second rod end. A brake lever having a first end is rotatably mounted to the second pivot shaft and a second end having a fourth clevis which pivotally receives the second rod end of the brake rod; The rod end shield extends longitudinally sufficiently far beyond the rod end to prevent the brake rod from disengaging from the third clevis in a direction towards the first brake crank in the event that the brake rod or its connection to the third clevis breaks, thereby avoiding the brake rod engaging the first steering arm.

The steering/braking mechanism may further comprise a second steering arm pivotally mounted about the first pivot shaft, and having a first clevis at a first end arranged on one side of the first pivot shaft for rotatably receiving a second pedal shaft and a second clevis at a second end arranged on an opposite side of the first pivot shaft for rotatably receiving a second steering rod. The mechanism may further comprise a second brake crank fixedly rotationally mounted to the second pedal shaft at a first end received within the first clevis of the second steering arm and having a third clevis at a second end. The mechanism may further comprise a second brake rod in accordance with the disclosure, the rod end bore of the rod end of the second brake rod being arranged within the third clevis of the second brake crank and receiving a clevis pin connecting the rod end to the third clevis of the second brake crank. The second brake rod has a second end, a second brake lever having a first end rotatably mounted to the second pivot shaft and a second end having a fourth clevis which pivotally receives the second end of the second brake rod.

The first and second steering rods may be coupled to a steering shaft which rotates in response to movement of the first and second steering rods and the first and second brake levers be connected to a brake mechanism.

The disclosure also provides a rod end shield for mounting to a rod. The rod end shield comprises a base portion for mounting to the rod and a shield portion extending from the base portion. The shield portion comprises a proximal straight portion for extending along an external surface of the rod and a distal curved portion for extending around the rod end.

DETAILED DESCRIPTION

Referring to FIGS. 1 to 5, a steering/braking mechanism 2 for an aircraft is shown.

Figure 4:
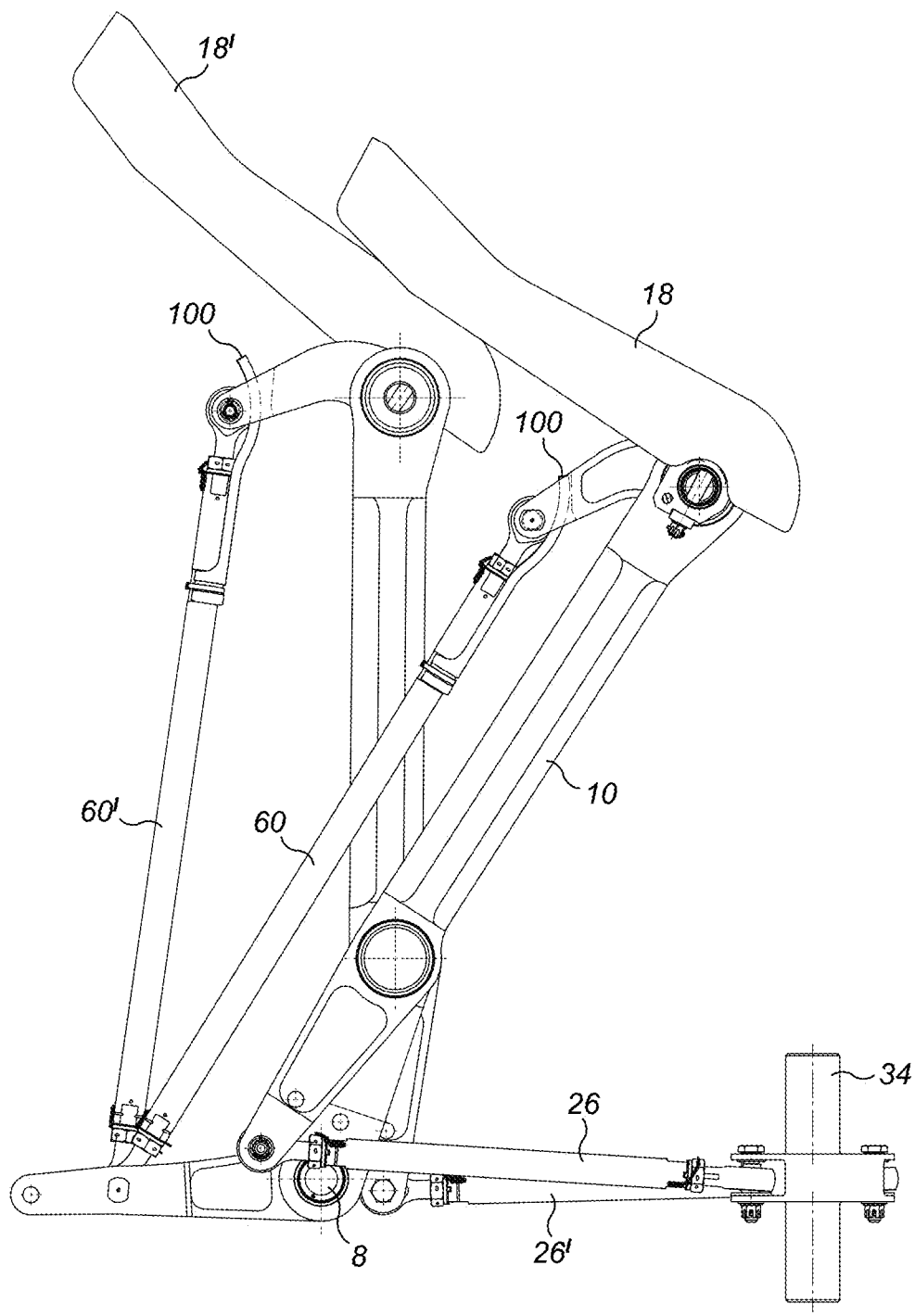
FIG. 4 shows the mechanism of FIG. 1 in a second configuration.
Figure 5:
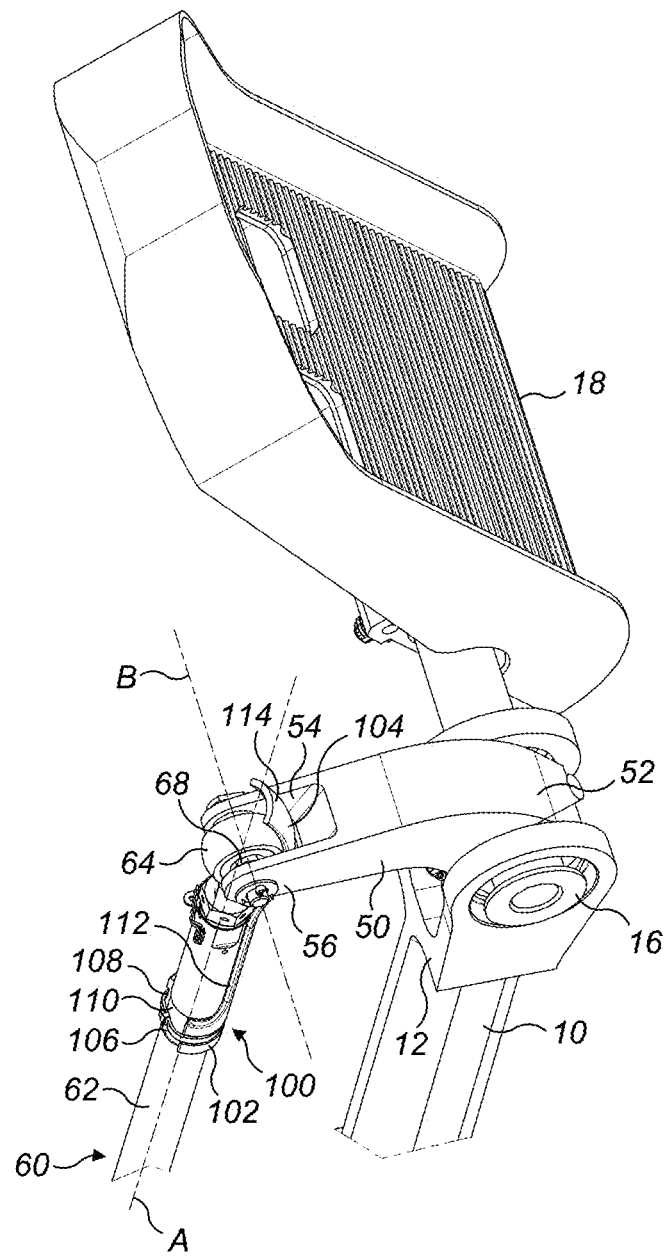
FIG. 5 shows a detail of the mechanism.

The mechanism 2 comprises a mount or base 4 which receives at an upper end a first pivot shaft 6 and at a lower end a second pivot shaft 8 (FIG. 4).

A first steering arm 10 is pivotally mounted about the first pivot shaft 6. The first steering arm 10 comprises a first clevis 12 at a first end 14 arranged on one side of the first pivot shaft 6. The first clevis 12 rotatably receives one end of a pedal shaft 16 in a suitable bearing. A first pedal 18 is rotationally fixedly mounted to the pedal shaft 16 by fasteners 20.

The first steering arm 10 also comprises a second clevis 22 at a second end 24 arranged on an opposite side of the first pivot shaft 6. The second clevis 22 rotatably mounts one end of a first steering rod 26 via a clevis pin 28. The other end 30 of the first steering rod 26 is rotatably connected, via a clevis connection, to an arm 32 of a steering shaft 34 which is mounted for rotation about an axis X (see FIG. 1). The shaft 34 is suitably connected in a known manner to a rudder of the aircraft.

A second steering arm 10' is also pivotally mounted about the first pivot shaft 6. The second steering arm 10' is similar in construction to the first steering arm 10 and thus also comprises a first clevis 12' at a first end 14' arranged on one side of the first pivot shaft 6. The first clevis 12' rotatably receives one end of a second pedal shaft 16'. A second pedal 18' is rotationally fixedly mounted to the second pedal shaft 16' by fasteners 20'. The second steering arm 10' also comprises a second clevis 22' at a second end 24' arranged on an opposite side of the first pivot shaft 6. The second clevis 22' rotatably mounts one end of a second steering rod 26' via a clevis pin 28'. The other end 30' of the second steering rod 26' is rotatably connected, via a clevis connection, to a second arm 32' of the shaft 34 which is fixed to move with the first arm 32.

The first and second steering arms 10, 10' are therefore coupled together via the first and second steering rods 26, 26' and the arms 32, 32' such that rotation of one of the steering arms 10, 10' in a first direction about the first pivot axis 6 (caused by a pilot pushing down on one or other the brake pedals 18, 18') will cause the shaft 34 to rotate about axis A (thereby causing movement of the aircraft rudder) and also then cause the other steering arm 10, 10' to rotate in an opposite direction about the first pivot shaft 6.

The mechanism 2 also comprises a braking mechanism 40. The braking mechanism 40 comprises a first brake crank 50 which is fixedly mounted to the first pedal shaft 16 at a first end 52, as can be seen most clearly in FIG. 5. The first end 52 is therefore received within the first clevis 12 of the first steering arm 10. The first brake crank 50 also comprises a third clevis 54 at a second end 56. The third clevis 54 receives one end of a first brake rod 60.

The brake rod 60 generally comprises a rod body 62 having a first rod end 64 and a second rod end 66 at opposed ends thereof. As shown, the first and second rod ends 64, 66 may be separate from the rod body 62 and mounted thereto in a known manner. The rod ends 64, 66 may be adjustable in a known manner to allow the overall length of the rod 60 to be modified. Turning again to FIG. 5, each rod end 64, 66 comprises a bore 68 therethrough having a bore axis B arranged perpendicular to a longitudinal axis A of the rod 60.

The bore 68 may mount a bearing, for example a spherical bearing and receives a clevis pin 70.

The first rod end 64 is received within the third clevis 54 of the first brake crank 50, the third clevis 54 receiving the clevis pin 70 thereby pivotally attaching the first brake rod 60 to the first brake crank 50.

The second rod end 66 is pivotally attached to a brake lever 80. The brake lever 80 has a first end 82 rotatably mounted to the second pivot shaft 8 and a second end 84 having a fourth clevis 86 which pivotally receives the second end 66 of the first brake linkage rod 60. A clevis pin 88 extends through the second rod end 66 and the fourth clevis 86 to pivotally couple the brake linkage rod 60 to the second brake arm 80. The second end 84 of the brake lever 80 comprises a fifth clevis 90 for attachment to a brake operating mechanism (not shown).

The braking mechanism 40 further comprises a second brake crank 50', a second brake rod 60' and a second brake lever 80'. The second brake crank 50' is fixedly mounted to the second pedal shaft 16' and the second brake lever 80' is mounted to the second pivot shaft 8 for rotation thereabout.

The interconnections between the second brake crank 50', the second brake rod 60' and the second brake lever 80' are the same as between the first brake crank 50, the first brake rod 60 and the first brake lever 80 and need not therefore be described in detail again.

As will be understood from the Figures, when the pedals 18, 18' are rotated counter clockwise about the axis of the pedal shafts 16, 16' (by applying a force at an upper part of the pedals 18, 18' remote from the pedal shafts 16, 16'), the brake crank arms 50, 50' will rotate thereby moving the brake levers 80, 80' downwardly via the brake rods 60, 60', to effect braking. This movement is independent of the rotational movement of the steering arms 10, 10', so both steering and braking can be effected simultaneously, by a suitable combination of pushing and rotation of the pedals 18, 18'.

As discussed above the first ends 64, 64' of the brake rods 60, 60' are received within the respective third devises 54, 54' of the first and second brake cranks 50, 50'. If the brake rods 60, 60' or their attachments to the third devises 54, 54' were to break, it is possible that the first ends 64, 64' may become wedged in the first clevis 14, 14' of the respective steering arms 10, 10'. Were that to happen, then it is possible that a steering movement of the steering arms 10, 10' may lead to an undesired braking movement of the brake rods 60, 60', thereby leading to uncommanded braking of the aircraft.

In order to mitigate this potential problem, each of the brake rods 60, 60' is provided with a rod end shield 100. The rod end shield 100 is mounted to the rod body 62 and extends in a longitudinal direction around and axially beyond the first rod end 64. This can clearly be seen for example in FIG. 3.

Figure 1:
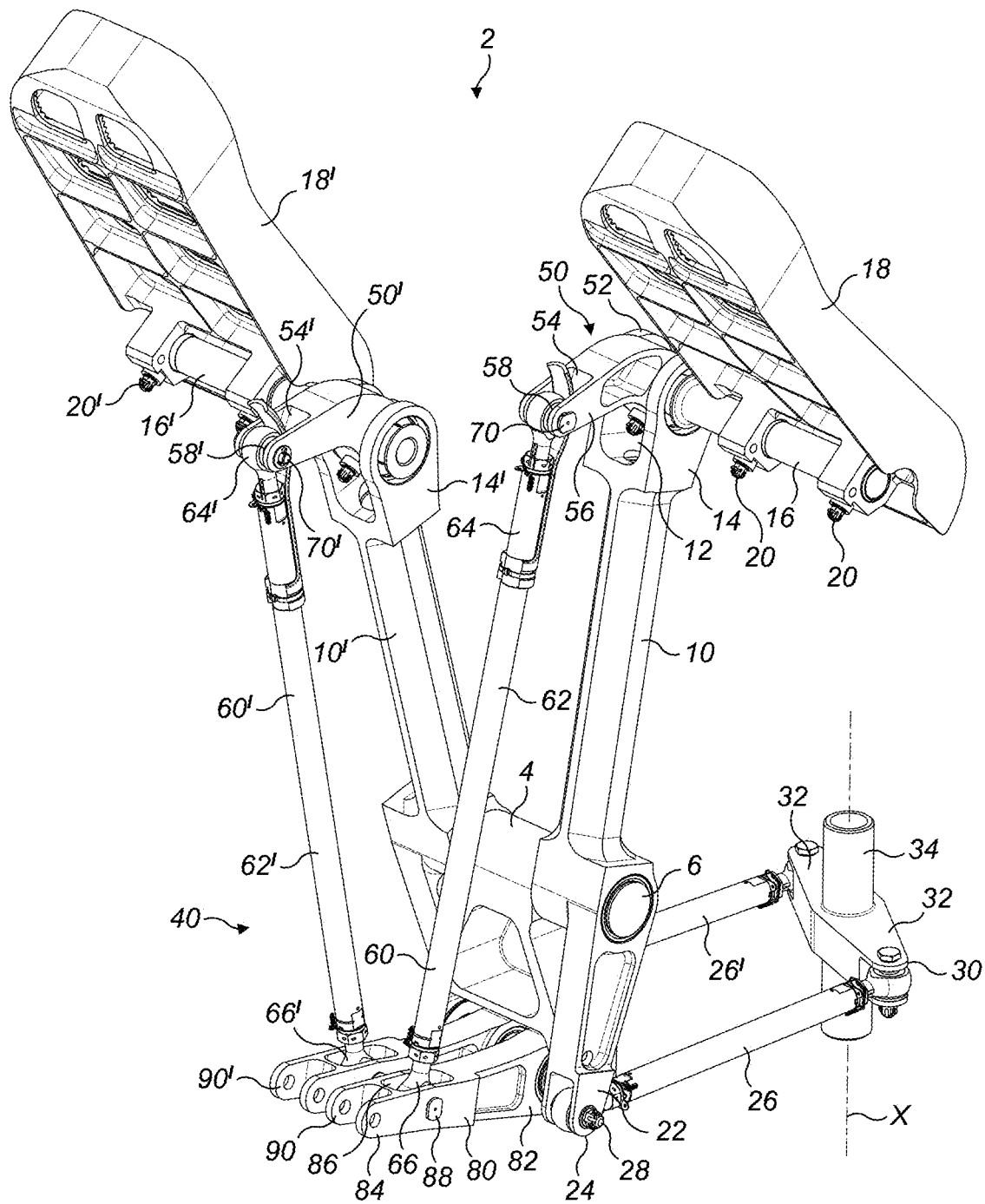
FIG. 1 shows a perspective view of an aircraft steering/braking mechanism embodying a brake rod in accordance with this disclosure.
Figure 2:
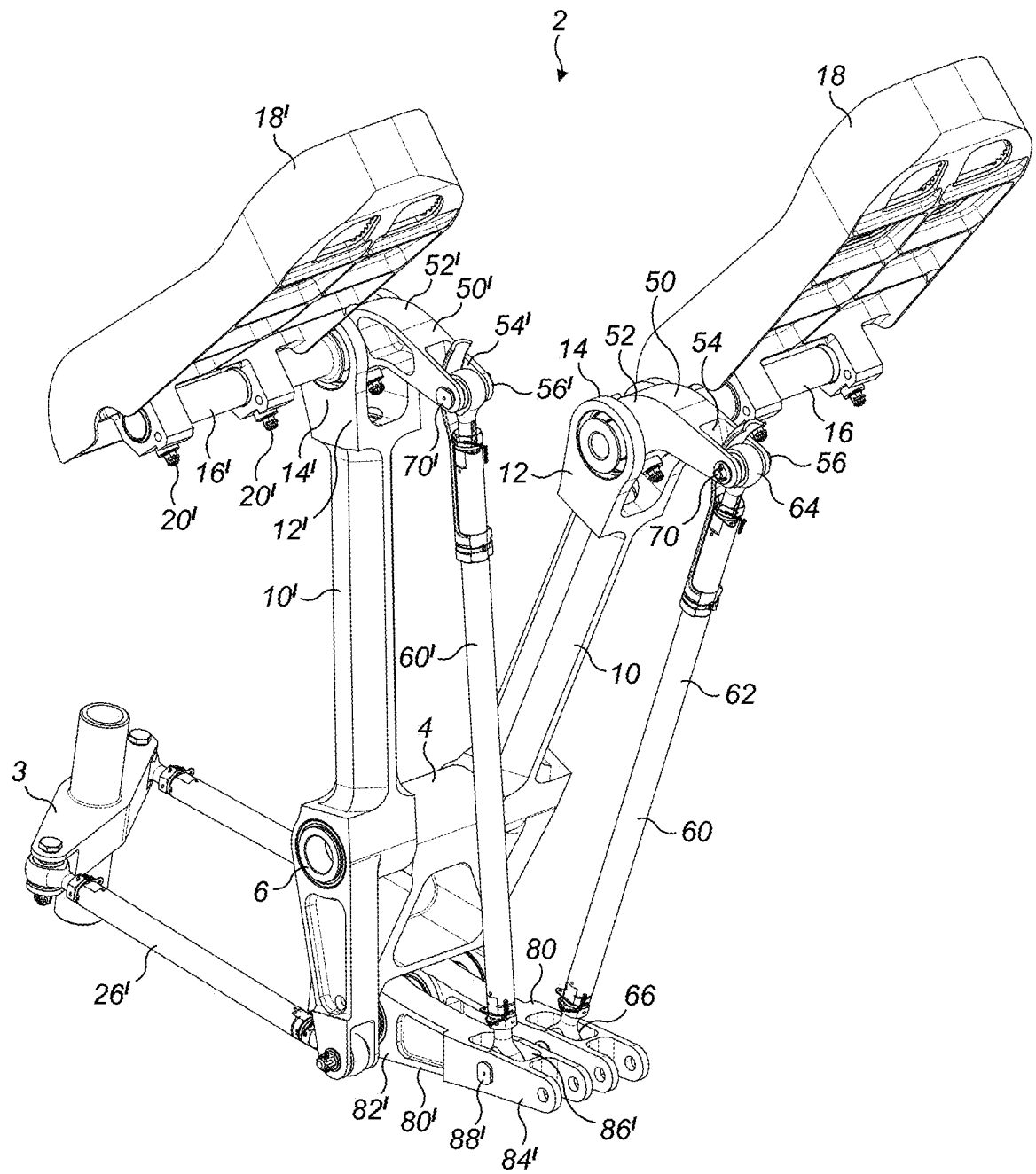
FIG. 2 shows a reverse perspective view of the aircraft steering/braking mechanism illustrated in FIG. 1.
Figure 3:
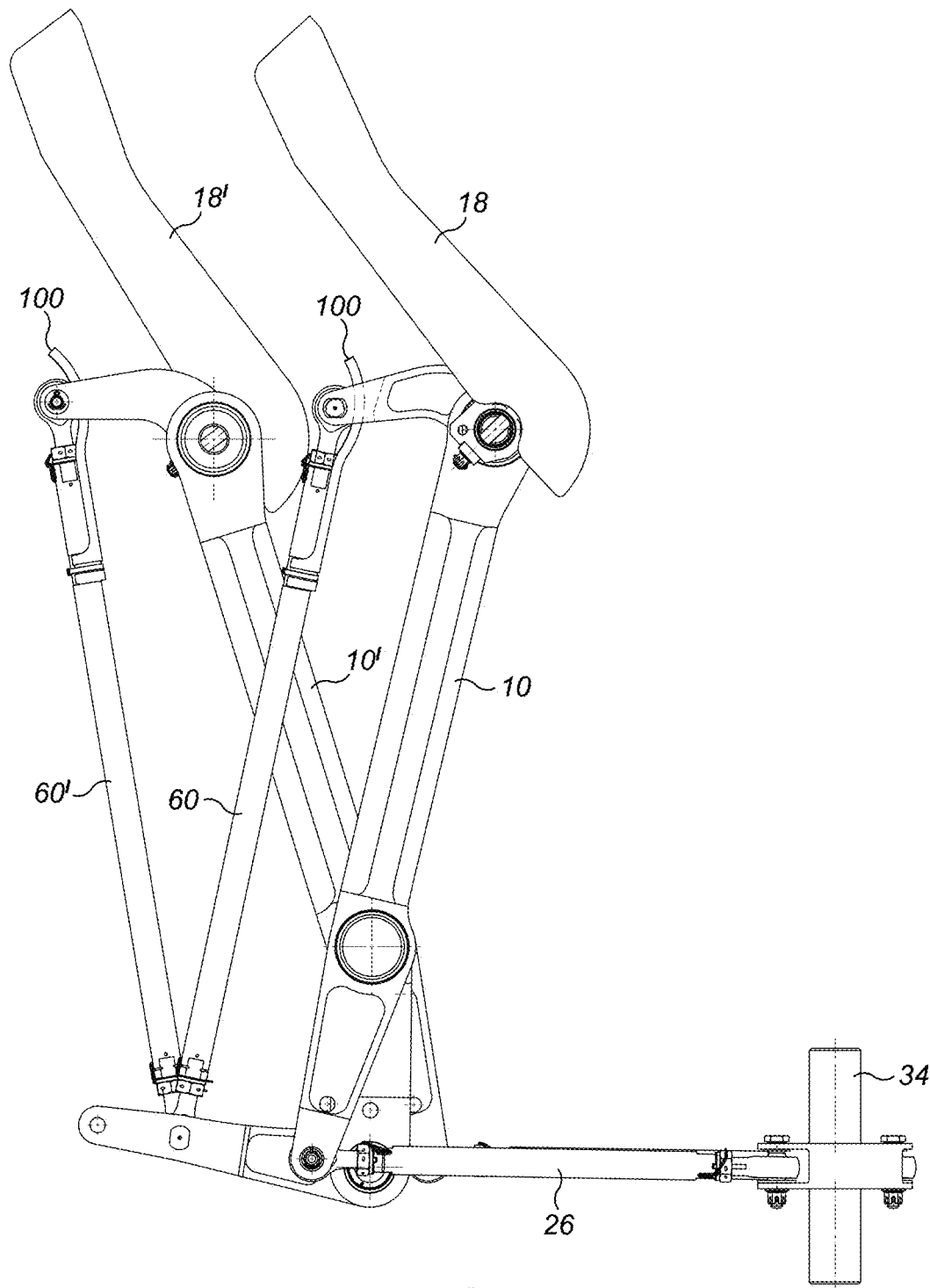
FIG. 3 shows the mechanism of FIG. 1 in a first configuration.

The rod end shield 100 is located on the side of the first rod end 64 facing the brake crank 50 such that the rod end shield 100 is received in the respective third clevis 54 between the first rod end 64 and the first brake crank 50. FIG. 3 shows one limit position of the mechanism 2, in which the rod end shield 100 projects a maximum distance from the third clevis 54. FIG. 4 shows the other limit position in which the rod end shield 100 is retracted into the third clevis 54 by a maximum amount. In this position, the rod end shield 100 may not project from the third clevis 54, but is still received within the third clevis 54 sufficiently to prevent the brake rod 60 from rotating clockwise and thereby potentially entering and interfering with the first clevis 12 if the coupling between the brake rod 60 and the brake crank 50 breaks.

Figure 6:
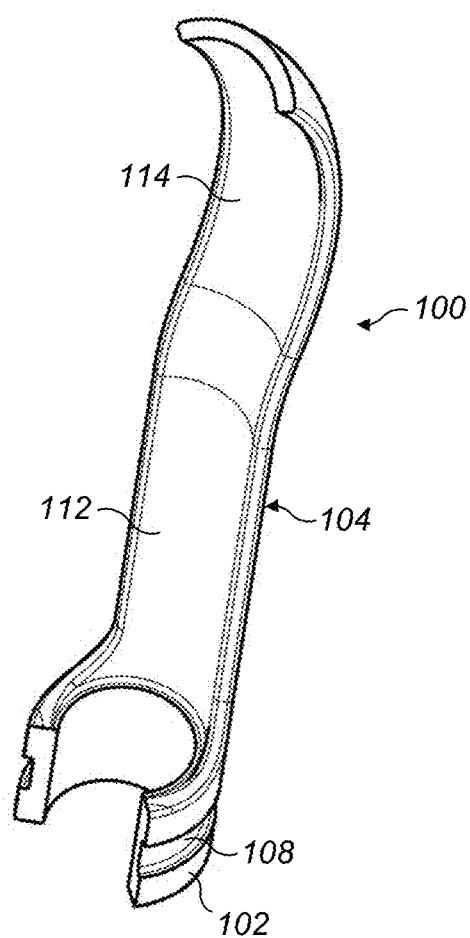
FIG. 6 shows a perspective view of the shield in isolation.
Figure 7:
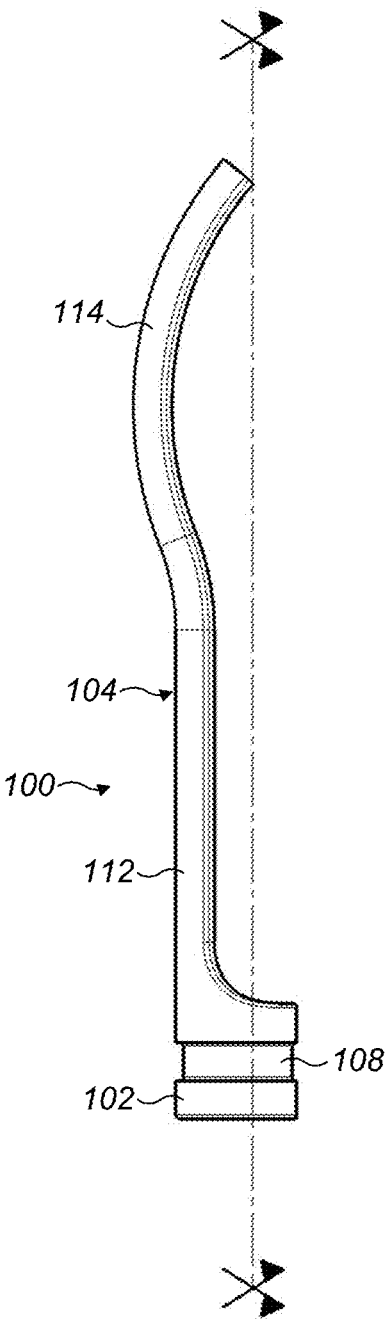
FIG. 7 shows a side view of the shield of FIG. 6.

As can be seen most clearly from FIGS. 6 and 7, the rod end shield 100 may comprise a base portion 102 which is mounted to the rod body 62 and a shield portion 104 which extends longitudinally away therefrom. It can be seen that in this embodiment, the base portion 104 extends circumferentially around a portion of the rod body 62. In some embodiments, the base portion 102 may extend for at least 200° around the circumference of the rod body 62.

The base portion 102 may be clamped to the rod 60 by any suitable means. In the illustrated embodiment, the base portion 104 is secured by a tie wrap 106. The base portion 102 may be provided with a circumferentially extending groove 108 to receive the tie wrap 106.

The rod body 62 may be provided with a locating element such as a shoulder 110 to locate the rod end shield 100 in the correct axial position.

As can be seen, the rod end shield 100 may be mounted to the rod 60 at only a single axial location of the rod 60 in one embodiment. If two axially spaced attachments were used, a failure of the rod 60 between the two attachment points would potentially not be detectable, because the shield 100 would keep the rod 60 in one piece. However, the shield 100 would break when applying load on the associated pedal 18, 18' pedal. Thus attachment of the rod end shield 100 at a single axial location is advantageous.

The shield attachment location is also potentially important: It should be low enough on the brake rod 60 to cover all possible failures that may occur above the attachment point, for example a fracture of the rod 60, a fracture of the clevis pin 70 or a fracture in the third clevis 54. Also, the shield attachment position should also advantageously be such that any rod rupture which occurs inboard of the attachment position has no effect, since the remaining length of broken rod 60 is too short to jam anywhere on the associated steering arm 10.

The shield portion 104 of the rod end shield 100 comprises a proximal straight portion 112 and a distal curved portion 114. The proximal straight portion 112 extends along and circumferentially around an external surface of the rod 60. The distal curved portion 114 curves longitudinally around the rod end 64. The curved portion 114 may also curve laterally around the rod end 64 for example when, as illustrated, the rod end 64 itself has a rounded shape. The curvature of the curved portion 114 may be centred on the bore end axis B. The curved portion 114 may, as shown, contact the rod end 64, for example over a line of contact.

The curved portion 114 also minimises the likelihood of any interference between the shield 100 and the third clevis 54 during normal operation of the mechanism.

As discussed above, the rod end shield 100 extends beyond the rod end 64 sufficiently to prevent the rod end 64 disengaging from the third clevis 54 in the event of a failure of the rod in the region of the rod end 66. Thus the length of the shield is important. A minimum length is necessary such that a broken rod 60 will still have a total length sufficient to avoid the possibility of the rod 60 becoming jammed in first clevis 12, for all pedal kinematic configurations. The precise length of the shield 100 necessary to achieve this will vary from installation to installation. However, in some embodiments, the curved portion 114 of the rod end shield 100 may extend around rod end 64 as far as the longitudinal axis B (FIG. 5) of the rod 60

The rod end shield 100 may for example be made from sheet metal or plastics. The base portion 102 of the rod end shield may, in certain embodiments, be sufficiently resilient to clip around the rod 60. In alternative embodiments, the base portion 102 may be slidably received over the rod 66 or deformed therearound.

The curved portion of the rod end shield 100 may be of substantially the same width as the rod end 64 over which it extends. As for thickness, it need only be sufficiently thick to support the rod 60 should it fail. It may, for example be up to 2 mm thick, for example 1 mm thick. A thickness of up to 1 mm may be appropriate for a metallic, for example a light alloy, material, while a thickness of up to 2 mm may be appropriate for a plastics shield 100.

It will be appreciated that the embodiment described above is exemplary only and that modifications may be made thereto which fall within the scope of the disclosure which is defined by the following claims.

Figure 8:
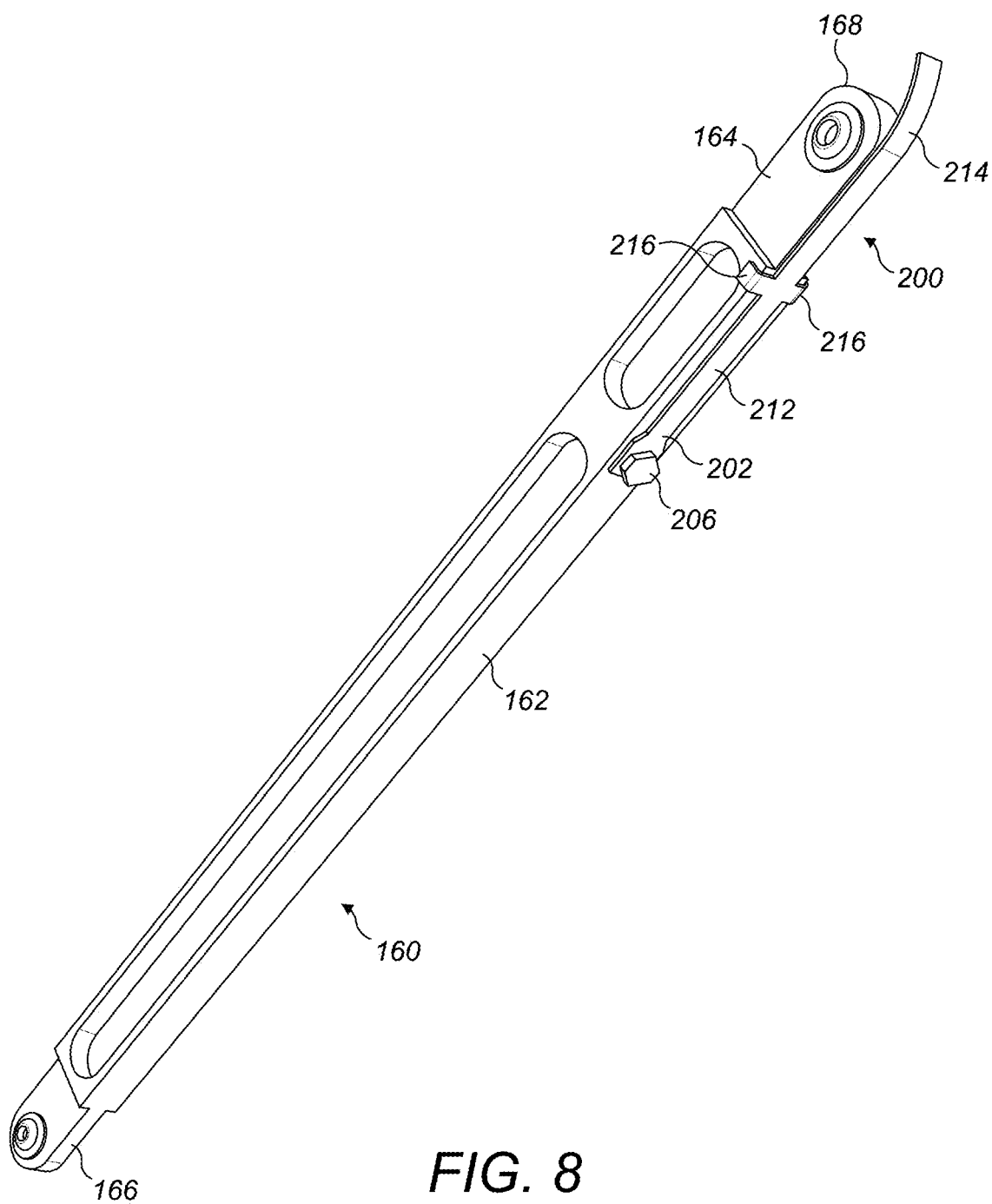
FIG. 8 shows a second embodiment of brake rod and shield in accordance with the disclosure.

FIG. 8 illustrates a further embodiment of the disclosure.

In this embodiment, instead of the rod ends being separate elements from the rod body as in the earlier embodiment, the rod ends 164,166 are formed integrally with the rod body 162 of the rod 160. The rod ends 164, 166 may therefore be suitably machined in the rod body 162. A bore 168 in each rod end 164, 166 may also mount a spherical bearing as in the first embodiment.

In this embodiment, the rod body 162 is generally rectangular in section, rather than cylindrical as in the first embodiment. This may facilitate manufacture.

The rod end shield 200 also has a base portion 202 which is mounted to the rod body 162 and a shield portion 204 extending axially therefrom. In this embodiment, the base portion of shield 200 is affixed by a fastener such as a screw 206. The shield portion 204 comprises a straight portion 212 which extends along the rod body 162 and a curved distal portion 214 which curves around and projects beyond the rod end 164, as in the earlier embodiment.

To prevent rotation of the shield 200 about the fastener 206, the shield 200 may be provided with location elements 216 which project over opposed lateral faces of the rod body 162.

The functioning of the shield 200 in this embodiment is the same as that in the earlier embodiment.

Features of the two described embodiments may be combined as appropriate. For example, the rod body of the embodiment of FIG. 8 may be cylindrical as in the embodiment of FIG. 1 and the base portion 202 of the shield 200 be curved to extend around the rod body 162, thereby obviating the need for the location elements 216.

The invention claimed is:

1. A brake rod for a steering/braking mechanism comprising:
    a rod body having a longitudinal axis;
    a rod end at a first end of the rod body, the rod end having a bore therethrough having a bore axis arranged generally perpendicular to the rod longitudinal axis; and
    a rod end shield mounted to the rod and extending in a longitudinal direction axially beyond the rod end so that the rod end shield extends beyond the rod end in an axial direction along the longitudinal axis of the rod body.

2. The brake rod as claimed in claim 1, wherein the rod end shield is curved towards the longitudinal axis of the rod body so as to comprise a curved portion that extends partially around the rod end.

3. The brake rod of claim 2, wherein the curved portion of the rod end shield extends around the rod end as far as the longitudinal axis of the rod body.

4. The brake rod as claimed in claim 1, wherein the rod end is formed integrally with the rod body.

5. The brake rod as claimed in claim 1, wherein the rod end shield comprises a base portion mounted to a first side of the rod end and a shield portion extending therefrom and only around the first side of the rod end.

6. The brake rod as claimed in claim 5, comprising a clamp separate to the base portion and clamping the base portion to the rod.

7. The brake rod as claimed in claim 6, wherein the clamp is a tie wrap and the base portion has a groove for receiving the tie wrap.

8. The brake rod as claimed in claim 5, comprising a fastener, for example a screw, attaching the base portion to the rod.

9. The brake rod as claimed in claim 8, wherein the shield portion comprises a proximal straight portion that extends parallel to the longitudinal axis of the rod body and along an external surface of the rod, and a distal curved portion extending around the rod end and curved towards the longitudinal axis of the rod body.

10. The brake rod as claimed in claim 1, wherein the rod end shield extends around the bore axis as far as the longitudinal axis of the rod.

11. The brake rod as claimed in claim 1, wherein the rod end shield is a sheet metal or plastics component.

12. The brake rod as claimed in claim 1, wherein the rod end shield (is mounted to the rod at a single axial location of the rod.

13. A steering/braking mechanism for an aircraft comprising:
a clevis comprising a clevis pin; and
a brake rod as claimed in claim 1, wherein the clevis pin extends through the bore for attaching the rod end to the clevis, and the rod end shield is configured to contact the clevis to limit rotation of the brake rod in case the attachment of the rod end to the clevis breaks.

14. A steering/braking mechanism for an aircraft comprising:
a mount receiving a first pivot shaft and a second pivot shaft;
a first steering arm pivotally mounted about the first pivot shaft, and having a first clevis at a first end arranged on one side of the first pivot shaft for rotatably receiving a pedal shaft and a second clevis at a second end arranged on an opposite side of the first pivot shaft for rotatably receiving a first steering rod;
a first brake crank fixedly mounted to the first pedal shaft at a first end received within the first clevis and having a third clevis at a second end;
a brake rod as claimed in claim 1, the rod end bore of the rod end being arranged within the third clevis and receiving a clevis pin connecting the rod end to the third clevis, the rod end shield being received in the third clevis between the rod end and the first brake crank, the brake rod having a second rod end; and
a brake lever having a first end rotatably mounted to the second pivot shaft and a second end having a fourth clevis which pivotally receives the second rod end of the brake rod;
wherein the rod end shield extends longitudinally sufficiently far beyond the rod end as to prevent the brake rod from disengaging from the third clevis in a direction towards the first brake crank in the event that the brake rod or its connection to the third clevis breaks, thereby avoiding the brake rod engaging the first steering arm.

15. The steering/braking mechanism as claimed in claim 14, further comprising:
a second steering arm pivotally mounted about the first pivot shaft, and having a first clevis at a first end arranged on one side of the first pivot shaft for rotatably receiving a second pedal shaft and a second clevis at a second end arranged on an opposite side of the first pivot shaft for rotatably receiving a second steering rod;
a second brake crank fixedly rotationally mounted to the second pedal shaft at a first end received within the first clevis of the second steering arm and having a third clevis at a second end;
a second brake rod as claimed in claim 1, the rod end bore of the rod end being arranged within the third clevis of the second brake crank and receiving a clevis pin connecting the rod end to the third clevis of the second brake crank, the second brake rod having a second end; and
a second brake lever having a first end rotatably mounted to the second pivot shaft and a second end having a fourth clevis which pivotally receives the second end of the second brake rod.

16. The steering/braking mechanism as claimed in claim 15, wherein:
the first and second steering rods are coupled to a steering shaft which rotates in response to movement of the first and second steering rods; and
the first and second brake levers are connected to a brake mechanism.

\* \* \* \* \*